United States Patent
Lee et al.

(10) Patent No.: US 9,455,817 B2
(45) Date of Patent: Sep. 27, 2016

(54) APPARATUS AND METHOD FOR FORMATING VIRTUAL CELL IN A VIRTUAL CELL NETWORK SYSTEM

(71) Applicants: Samsung Electronics Co., Ltd., Gyeonggi-do (KR); Korea Advanced Institute of Science and Technology, Daejeon (KR)

(72) Inventors: Jung Hoon Lee, Daejeon (KR); Wan Choi, Daejeon (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/323,871

(22) Filed: Jul. 3, 2014

(65) Prior Publication Data

US 2015/0009841 A1 Jan. 8, 2015

(30) Foreign Application Priority Data

Jul. 3, 2013 (KR) ........................ 10-2013-0077814

(51) Int. Cl.
*H04J 1/16* (2006.01)
*H04L 5/00* (2006.01)
*H04L 5/14* (2006.01)

(52) U.S. Cl.
CPC .......... *H04L 5/0073* (2013.01); *H04L 5/0053* (2013.01); *H04L 5/14* (2013.01)

(58) Field of Classification Search
CPC ... H04L 5/0058; H04L 5/006; H04L 5/0073; H04L 5/14; H04L 5/0053; H04L 5/0055; H04L 5/0057
See application file for complete search history.

(56) References Cited

U.S. PATENT DOCUMENTS

| | | | | |
|---|---|---|---|---|
| 7,991,358 B2* | 8/2011 | Kim | ........... | H04B 17/24 370/203 |
| 2007/0026813 A1* | 2/2007 | Khan | ........... | H04L 1/0026 455/69 |
| 2007/0207810 A1* | 9/2007 | Cho | ........... | H04L 1/0026 455/450 |
| 2008/0132173 A1* | 6/2008 | Sung | ........... | H04L 1/0019 455/67.13 |
| 2008/0227395 A1* | 9/2008 | Kim | ........... | H04B 17/24 455/62 |
| 2008/0233989 A1* | 9/2008 | Kim | ........... | H04L 1/0003 455/517 |
| 2009/0257387 A1* | 10/2009 | Gholmieh | ........... | H04L 5/0053 370/329 |
| 2010/0002575 A1* | 1/2010 | Eichinger | ........... | H04L 5/0046 370/210 |
| 2010/0281333 A1* | 11/2010 | Jongren | ........... | H04L 1/0026 714/752 |

(Continued)

FOREIGN PATENT DOCUMENTS

KR 10-2010-0102512 9/2010

*Primary Examiner* — Kevin Mew

(57) ABSTRACT

An apparatus is configured to perform a method for providing a wireless communication service to at least one User Equipment (UE) from among a plurality of UEs having links established with a distributed small Base Station (BS) in a Virtual Cell Network (VCN) system in which a plurality of virtual cells exist within one macro cell. The method includes selecting at least one UE to which a wireless communication service is to be provided in a virtual cell, calculating a feedback allocation amount for each of the selected at least one UE, by sharing path losses and user characteristics measured and determined on a UE basis by each of the plurality of virtual cells, and providing information about the calculated feedback allocation amount to the selected at least one UE.

20 Claims, 9 Drawing Sheets

(56) References Cited

U.S. PATENT DOCUMENTS

| | | | | |
|---|---|---|---|---|
| 2011/0007643 A1* | 1/2011 | Liang | H04L 5/0053 | 370/252 |
| 2012/0033575 A1* | 2/2012 | Zhang | H04B 7/0417 | 370/252 |
| 2012/0147831 A1* | 6/2012 | Golitschek | H04L 1/0026 | 370/329 |
| 2012/0155408 A1* | 6/2012 | Pedersen | H04L 1/0026 | 370/329 |
| 2012/0218963 A1* | 8/2012 | Kim | H04L 1/1681 | 370/329 |
| 2013/0028218 A1* | 1/2013 | Chun | H04L 5/0023 | 370/329 |
| 2013/0033571 A1* | 2/2013 | Steen | G06T 19/20 | 348/46 |
| 2013/0072247 A1* | 3/2013 | Park | H04B 7/0408 | 455/513 |
| 2013/0182683 A1* | 7/2013 | Seol | H04W 72/04 | 370/335 |
| 2013/0194951 A1* | 8/2013 | Kim | H04W 72/005 | 370/252 |
| 2013/0272263 A1* | 10/2013 | Pi | H04W 72/042 | 370/330 |
| 2014/0044061 A1* | 2/2014 | Yue | H04W 72/042 | 370/329 |
| 2014/0155113 A1* | 6/2014 | Lee | H04W 24/02 | 455/501 |
| 2015/0195070 A1* | 7/2015 | Kim | H04L 1/0027 | 370/329 |
| 2015/0256317 A1* | 9/2015 | Wang | H04B 7/024 | 370/329 |

* cited by examiner

1. User selection and feedback bit allocation

2. Pilot broadcasting

3. Quantization and Feedback

4. Service

APPARATUS AND METHOD FOR FORMATING VIRTUAL CELL IN A VIRTUAL CELL NETWORK SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 3, 2013 and assigned Serial No. 10-2013-0077814, the entire disclosure of which is incorporated herein by reference.

TECHNICAL FIELD

The present disclosure relates to an apparatus and method for forming a virtual cell based on a channel feedback in a Virtual Cell Network (VCN) system.

BACKGROUND

In general, a wireless communication system can increase performance using channel information about a transmitter. For example, a wireless communication system operating in Frequency Division Duplexing (FDD) (hereinafter, referred to as an FDD system) uses different frequencies on uplink and downlink. Since an uplink channel and a downlink channel are independent of each other in the FDD system, a receiver should transmit channel information to a transmitter.

In the FDD system, for example, the receiver quantizes the channel information, taking into account a limited feedback capacity and transmits the quantized channel information to the transmitter. In this case, the transmitter may receive incorrect channel information having a quantization error. This incorrect channel information may degrade system performance.

Such performance degradation may occur significantly from an interference channel. Accordingly, the FDD system needs a technique for efficiently using a limited feedback capacity for an interference channel between transmitters.

In general, a feedback scheme for an interference channel is based on the premise that a transmitter and a receiver are predetermined.

For example, in a cellular system, User Equipments (UEs) to receive a service are predetermined on a Base Station (BS) basis. Therefore, various feedback schemes may be available for a BS to provide a service to predetermined UEs.

For example, in a situation where a transmitter and a receiver are preset, every UE quantizes channel information and provides a predetermined amount of feedback information to a BS. The BS selects at least one UE based on the feedback information received from all UEs. The BS may select the at least one UE in such a manner that the sum of total data rates may be maximized.

However, the foregoing UE selection scheme is not suitable for a specific VCN system. The specific VCN system may be a system in which a plurality of distributed small BSs share a plurality of UEs in one physical space. The physical space may be a macro cell serviced by a macro BS.

What channel information each UE should feed back to which distributed small BS in the VCN system has not been specified yet. Because each UE may receive a service from one of a plurality of distributed small BSs, it is difficult to determine what channel information to be quantized and fed back.

Conventionally, the amount of feedback information is equal for each UE, with no regard to the characteristics of UEs and data. As a result, resources are unnecessarily consumed for feedback.

In this context, there is a pressing need for developing a feedback scheme that can be efficiently combined with a virtual cell formation scheme in a VCN system. That is, there is a need for a method for forming a virtual cell and allocating feedback bits such that performance degradation caused by incorrect channel information may be minimized.

Considering that various types of content and various services are provided in wireless communication systems, it is necessary to design a feedback scheme in consideration of the characteristics of UEs and data.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for forming a virtual cell by allocating feedback bits to each User Equipment (UE) selected for forming the virtual cell in a Virtual Cell Network (VCN) system.

Another aspect of the present disclosure is to provide a channel feedback scheme which is performed in conjunction with virtual cell formation in order to minimize performance degradation caused by feedback, when a virtual cell is formed in a VCN system.

Another aspect of the present disclosure is to provide an apparatus and method for forming a virtual cell by allocating feedback bits to a UE selected for forming the virtual cell, taking into account at least one of a characteristic of the UE, the type of transmission data, and a service type in a VCN system.

Another aspect of the present disclosure is to provide an apparatus and method for forming a virtual cell by allocating feedback bits to a UE selected for forming the virtual cell according to a characteristic of the UE, so that more UEs may achieve their desired data rates in a VCN system.

Another aspect of the present disclosure is to provide a feedback scheme that can satisfy demands of more UEs by additionally considering a characteristic of a UE and a service type in forming a virtual cell in a VCN system.

Another aspect of the present disclosure is to provide an apparatus and method for forming a virtual cell by distributing one feedback uplink to a plurality of UEs associated with one distributed small BS and enabling the UEs to transmit feedback information on the distributed feedback uplink in a VCN system.

In accordance with an aspect of the present disclosure, there is provided a method for providing a wireless communication service to at least one UE from among a plurality of UEs having links established with a distributed small Base Station (BS) in a VCN system in which a plurality of virtual cells exist within one macro cell. The method includes selecting at least one UE to which a wireless communication service is to be provided in a virtual cell, calculating a feedback allocation amount for each of the selected at least one UE, by sharing path losses and user characteristics measured and determined on a UE basis by each of the plurality of virtual cells, and providing information about the calculated feedback allocation amount to the selected at least one UE.

In accordance with another aspect of the present disclosure, there is provided an apparatus for providing a wireless communication service to at least one UE from among a plurality of UEs having links established with a distributed small BS in a VCN system in which a plurality of virtual cells exist within one macro cell. The apparatus includes a calculator configured to select at least one UE to which a wireless communication service is to be provided in a virtual cell and calculate a feedback allocation amount for each of the selected at least one UB, by sharing path losses and user characteristics measured and determined on a UE basis by each of the plurality of virtual cells, and a communication unit configured to provide information about the calculated feedback allocation amount to the selected at least one UE.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
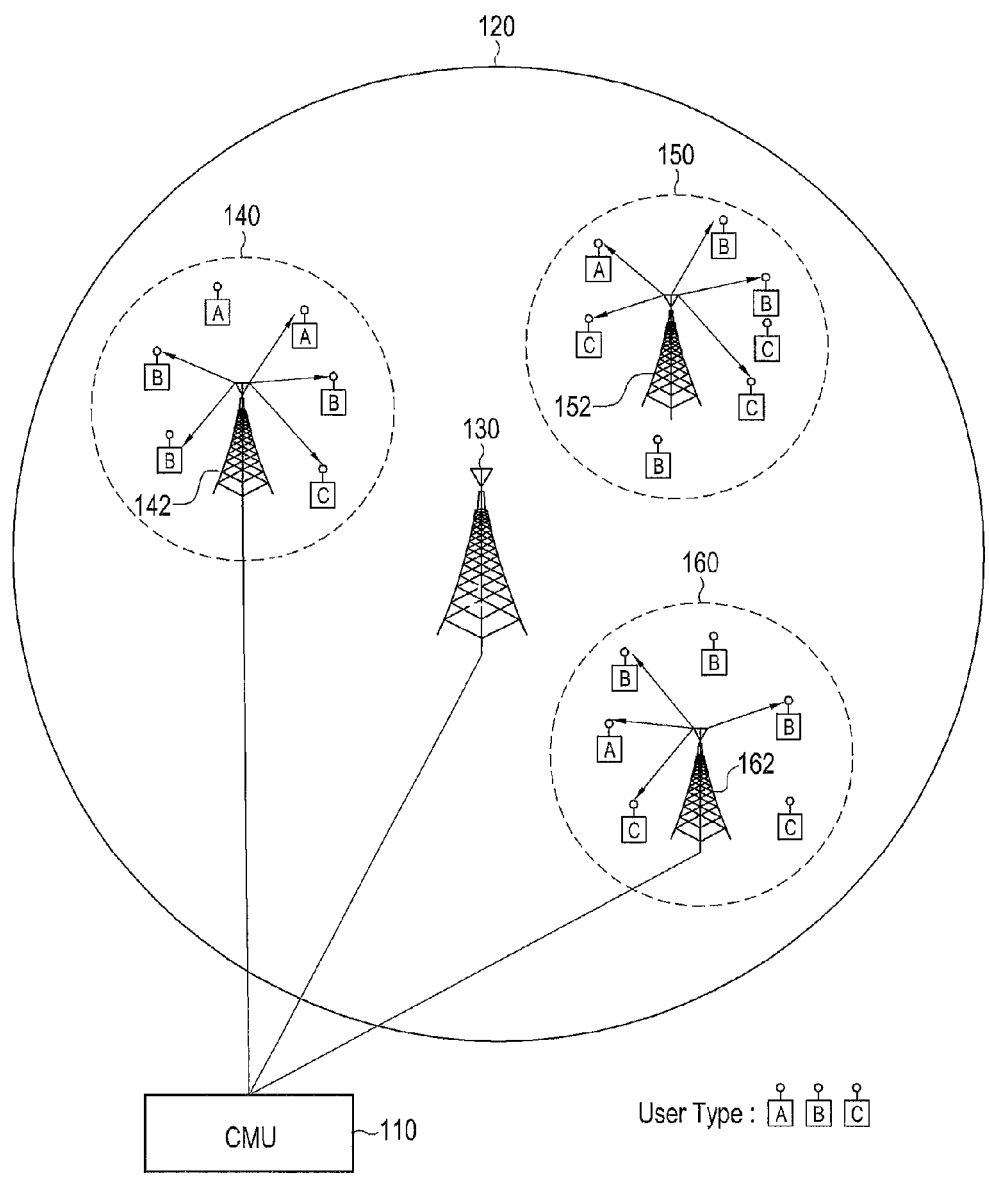
FIG. 1 illustrates an example Virtual Cell Network (VCN) system requiring a feedback allocation scheme according to an embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A detailed description will be given of a method for considering at least one of a characteristic of a User Equipment (UE), the type of transmission data, and a service type in addition to existing information taken into account, to efficiently form a virtual cell and allocate feedback bits in a Virtual Cell Network (VCN) system according to an embodiment of the present disclosure.

For this purpose, when a feedback scheme is designed in the VCN system, UEs are classified into a plurality of types, taking into account a characteristic of each UE as well as the type and quality of a service required for the UE. The reason for additionally considering a characteristic of each UE is to satisfy demands of more UEs, when UEs are classified.

The following are to be considered in forming a virtual cell and implementing a channel feedback scheme for the virtual cell in a VCN system according to an embodiment of the present disclosure.

First, since UEs to be serviced by each Base Station (BS) are not predetermined in the VCN system, a virtual cell should be formed by selecting UEs to be serviced and feedback bits should be allocated to each of the selected UEs, at the same time. That is, a virtual cell should be formed, taking into account feedback loss in the VCN system. This will prevent unnecessary resource consumption of UEs.

Second, since a virtual cell is formed by selecting UEs to be serviced in the VCN system, only the selected UEs (only the UEs to be serviced) should report feedback information. The resulting reduction of interference that is increased by simultaneously servicing a plurality of UEs may provide a communication environment in which a relatively accurate feedback is performed.

Third, as only selected UEs (only UEs to be serviced) are supposed to report feedback information in the VCN system, a relatively large number of feedback bits may be allocated to the selected UEs, compared to feedback from all UEs. As a consequence, a communication environment may be provided, in which a UE can report relatively detailed and accurate feedback information.

Fourth, a different number of feedback bits is allocated to each UE to be serviced, taking into account a characteristic, a service type, and a service characteristic of the UE to be serviced (the selected UE) in the VCN system. Thus, selected UEs sharing one uplink control channel may adapt to the characteristics of the VCN system.

To satisfy the above considerations, it is preferred in embodiments of the present disclosure that a virtual cell is formed and feedback bits are allocated to at least one UE selected for forming the virtual cell, at the same time.

Particularly, when at least one UE is selected to form a virtual cell, a characteristic of each UE and the type of data to be serviced for the UE are considered.

For example, UEs are classified, taking into account the qualities of services to be provided (for example, Priority User, Normal User, and the like may be defined according to a charging policy), the characteristic of data to be serviced (for example, Video Service, Voice Service, and the like may be defined), the size of a queue, and the like.

A maximum data rate that may be achieved for each UE class is set. For example, if UE classes are classified into 'first grade', 'second grade', and 'third grade', the maximum data rates for the UE classes may be set to '1 Mbps', '0.5 Mbps', and '0.1 Mbps', respectively.

To maximize data rates for UEs to be serviced by each distributed small BS in consideration of the above-described conditions, a number of feedback bits is allocated to each UE to be serviced. This is possible only if a characteristic and a service type of each UE are considered. The number of feedback bits allocated to each UE is directly related to a codebook size and quantization accuracy.

Now, embodiments of the present disclosure will be described below in detail with reference to the attached drawings.

FIG. 1 illustrates an example VCN system requiring a feedback allocation scheme according to an embodiment of the present disclosure. That is, FIG. 1 demonstrates a reason for feedback allocation in consideration of a characteristic of a UE and a service type for the UE in a VCN system.

Referring to FIG. 1, a macro BS 130 supports a wireless communication service for UEs located within a macro cell 120. At least one virtual cell may be formed in the macro cell 120. For example, the at least one virtual cell is formed by a distributed small BS. That is, at least one distributed small BS is located in the macro cell 120 and a virtual cell is formed by the at least one distributed small BS.

One or more UEs are located within the virtual cell formed by the at least one distributed small BS. All or a part of the UEs within the virtual cell establish links with the distributed small BS. Link establishment means establishment of a connection through which a wireless communication service may be received from a distributed small BS.

For example, three virtual cells 140, 150, and 160 are formed in the macro cell 120 in the illustrated case of FIG. 1. The three virtual cells 140, 150, and 160 are formed by three distributed small BSs 142, 152, and 162, respectively. Specifically, a first distributed small BS 142 forms a first virtual cell 140, a second distributed small BS 152 forms a second virtual cell 150, and a third distributed small BS 162 forms a third virtual cell 160.

A plurality of UEs are located in each of the three virtual cells 140, 150, and 160. Specifically, UEs corresponding to six users are located in the first virtual cell 140, UEs corresponding to seven users are located in the second virtual cell 150, and UEs corresponding to six users are located in the third virtual cell 160.

A UE located in one of the first, second, and third virtual cells 140, 150, and 160 may establish a link with a distributed small BS that forms the virtual cell of the UE. Even though a UE is located in a virtual cell, the UE may not establish a link with a distributed small BS that forms the virtual cell. This UE may establish a link with the macro BS 130 instead of a distributed small BS and may receive the wireless communication service from the macro BS 130 through the link.

For the convenience of description, it is assumed in FIG. 1 that all UEs located in each virtual cell establish links with a distributed small BS that forms the virtual cell.

Each of the first, second, and third distributed small BSs 142, 152, and 162 classifies UEs located in its service area, that is, the virtual cell 140, 150, or 160, into a plurality of groups, taking into account the types of the UEs. The types of the UEs may be defined according to data rates required by the UEs. In this case, the UEs may be classified into type A, type B, and type C according to their required data rates.

For example, the first, second, and third distributed small BSs 142, 152, and 162 may classify the UEs located in their virtual cells 140, 150, and 160 as illustrated in Table 1.

TABLE 1

| Distributed small BS (virtual cell) | User type (required data rate) | The number of UEs |
| --- | --- | --- |
| First distributed small BS (first virtual cell) | A (1 Mbps) | 2 |
|  | B (0.5 Mbps) | 3 |
|  | C (0.1 Mbps) | 1 |
| Second distributed small BS (second virtual cell) | A (1 Mbps) | 1 |
|  | B (0.5 Mbps) | 3 |
|  | C (0.1 Mbps) | 3 |
| Third distributed small BS (third virtual cell) | A (1 Mbps) | 1 |
|  | B (0.5 Mbps) | 2 |
|  | C (0.1 Mbps) | 3 |

In Table 1, it is assumed that UEs are classified into group A, group B, and group C according to their required data rates. However, the classification criterion for UEs is not limited to required data rate. Thus, instead of required data rate, the type of a service required by each UE, the type of transmission data, or the like may be used as a classification criterion.

As described above, UEs are classified into a plurality of types according to their required data rates or service types. The UEs are apart from the distributed small BSs 142, 152, and 162 by different distances. Therefore, one UE may receive signals from the distributed small BSs 142, 152, and 162, with different path losses.

Accordingly, a UE to be serviced may be selected based on the path loss of each user and feedback bits may be allocated to the selected UE. The distributed small BSs 142, 152, and 162 may receive Reference Signals (RSs) from UEs and then may measure the path losses of the UEs in the received RSs. The RSs may be pilot signals that the UEs transmit over a long term.

To select UEs to be serviced in the virtual cells 140, 150, and 160 and calculate a feedback allocation amount (for example, the number of feedback bits) for the selected UEs, the distributed small BSs 142, 152, and 162 preferably share the path loss measurements. That is, when each virtual cell selects UEs to be serviced and calculates the numbers of feedback bits to be allocated to the selected UEs, the virtual cell may take into account the path loss of each UE measured by other virtual cells.

A different method for sharing path losses of UEs measured by the distributed small BSs 142, 152, and 162 and the characteristics of the UEs (for example, the channel characteristics of the UEs) may be implemented depending on an entity that is responsible for selecting UEs to be serviced in each virtual cell and calculating the numbers of feedback bits for the selected UEs.

For example, if a Central Management Unit (CMU) 110 is responsible for selecting UEs and calculating the numbers of feedback bits for the selected UEs, the distributed small BSs 142, 152, and 162 provide their measured path losses and characteristics of UEs to the CMU 110. Thus, the CMU 110 may collect the path losses and characteristics of the UEs measured and determined by all of the distributed small BSs 142, 152, and 162.

In this case, the CMU 110 may select at least one UE to be serviced from among UEs connected to each of the distributed small BSs 142, 152, and 162, taking into full account information about the path losses and the characteristics of the UEs collected from all of the distributed small BSs 142, 152, and 162. Then the CMU 110 calculates a feedback allocation amount, that is, the number of feedback bits for each of the selected at least one UE.

The CMU 110 provides information about the selected at least one UE (hereinafter, referred to as UE selection information) and information about the calculated feedback allocation amount for the selected at least one UE (hereinafter, referred to as feedback allocation information) to a distributed small BS associated with the selected at least one UE.

In another example, if each of the distributed small BSs 142, 152, and 162 is responsible for selecting a UE and calculating the number of feedback bits for the selected UE, each of the distributed small BSs 142, 152, and 162 exchanges its measured path losses and characteristics of UEs with the other distributed small BSs. In this manner, the distributed small BSs 142, 152, and 162 share the measured path losses and characteristics of UEs with one another.

Each of the distributed small BSs 142, 152, and 162 selects at least one UE to be serviced from among UEs connected to the distributed small BS, taking into full account the path losses and the characteristics of the UEs shared with the other distributed small BSs in the above procedure. Then the distributed small BS calculates a feedback allocation amount, that is, the number of feedback bits to be allocated to the selected at least one UE.

The distributed small BSs 142, 152, and 162 provide information about their selected UEs, that is, UE selection information to the CMU 110. In addition, the distributed small BSs 142, 152, and 162 may provide feedback allocation information determined for their selected UEs to the CMU 110.

In the above two examples, UE selection based on shared information about path losses and characteristics of UEs or calculation of a feedback allocation amount for each of selected UEs may be performed in the same manner.

For example, if B1 bits are given as a total feedback amount (that is, a total feedback allocation amount) for a distributed small BS, it is preferred to allocate feedback bits in such a manner that the required data rates of more UEs may be satisfied among UEs with links established with the distributed small BS. For this purpose, the distributed small BS should fully consider the types of the UEs connected to it, service types required by the UEs, the amounts of transmission date, and the like in addition to path loss measurements and characteristics of the UEs and the total feedback allocation amount. Different total feedback amounts may be given to different distributed small BSs. That is, a total feedback amount may be determined for each distributed small BS, taking into account the number of users selected by the distributed small BS, the types of the selected users, service types of the selected users, and the like.

The distributed small BSs 142, 152, and 162 provide the UE selection information and the feedback allocation information acquired in one of the above two examples to all or at least one of UEs connected to them.

UEs establish links with one of the distributed small BSs 142, 152, and 162 and transmit long-term RSs to the distributed small BS so that the distributed small BS may measure path losses of the UEs.

The UEs receive UE selection information and feedback information from the distributed small BS connected to them from among the distributed small BSs 142, 152, and 162. A UE selected by the UE selection information receives RSs from the distributed small BSs 142, 152, and 162 and generates feedback information based on the qualities of the received RSs and the like. The selected UE transmits the feedback information to the distributed small BS connected to it based on the received feedback allocation information, that is, an allocated number of feedback bits.

For example, the selected UE quantizes channel information for feedback and transmits the quantized channel information to the distributed small BS connected to it.

Subsequently, the selected UE receives a user service and a wireless communication service from the distributed small BS connected to it. That is, the distributed small BS services a plurality of selected UEs at once through multiple antennas based on quantized channel information received from the selected UEs.

FIGS. 2A to 2D illustrate a service providing procedure in a VCN system according to an embodiment of the present disclosure.

Figure 2A:
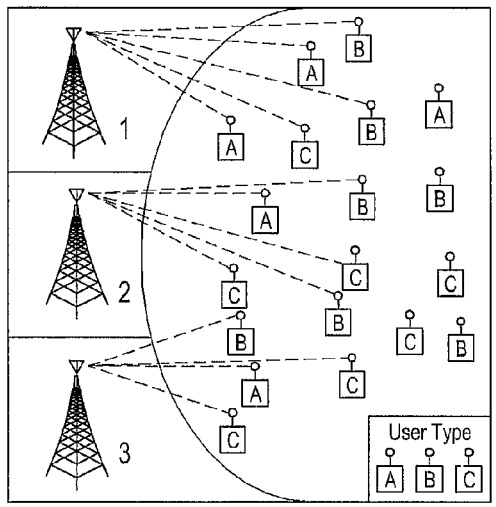
FIGS. 2A to 2D illustrate a service providing procedure in a VCN system according to an embodiment of the present disclosure.

Referring to FIGS. 2A to 2D, each distributed small BS selects at least one UE to be serviced by it, taking into account characteristics of UEs and allocates feedback bits to each of the selected at least one UE. The distributed small BS indicates the allocated feedback bits to the selected at least one UE (FIG. 2A). While not shown, UEs transmit RSs to the distributed small BSs so that the distributed small BSs may measure path losses of the UEs for use in selecting UEs and allocating feedback bits to the selected UEs.

Figure 2B:
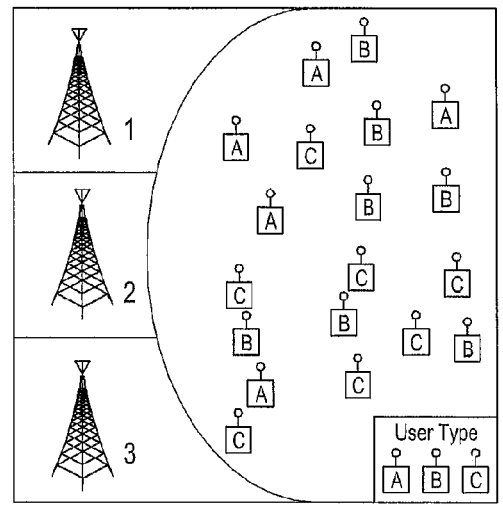
Figure 2C:
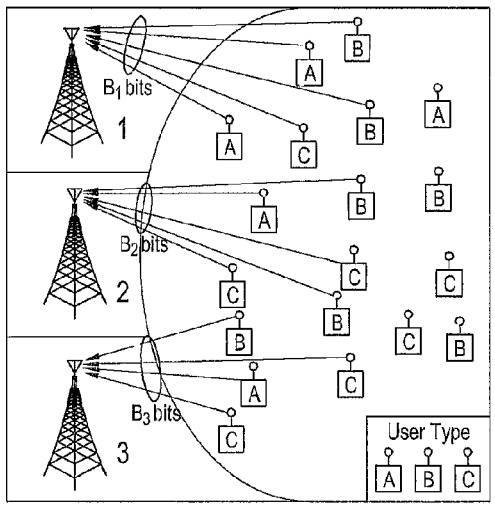

Each distributed small BS broadcasts a pilot signal so that the selected at least one UE may generate feedback information, that is, channel information (FIG. 2B). The selected at least one UE receives the pilot signal broadcast by the distributed small BS and generates channel information based on the received pilot signal. Then the selected at least one UE quantizes the channel information to feedback bits allocated to the UE and feeds back the quantized channel information to the distributed small BS (FIG. 2C). Alternatively or additionally, the UE may feed back the quantized channel information to all of the distributed small BSs.

Figure 2D:
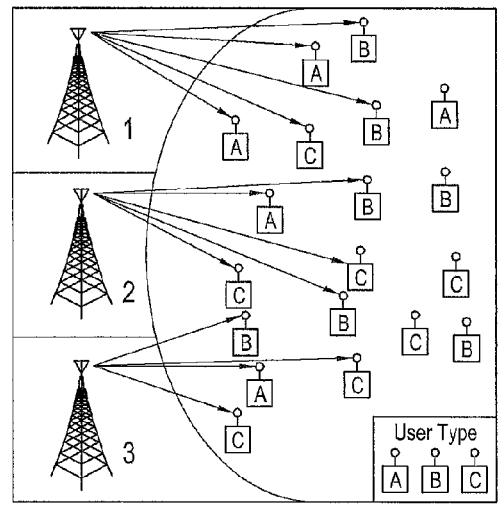

The distributed small BS provides a service to the selected at least one UE at the same time through multiple antennas based on the quantized channel information received from the selected at least one UE (FIG. 2D).

Figure 3:
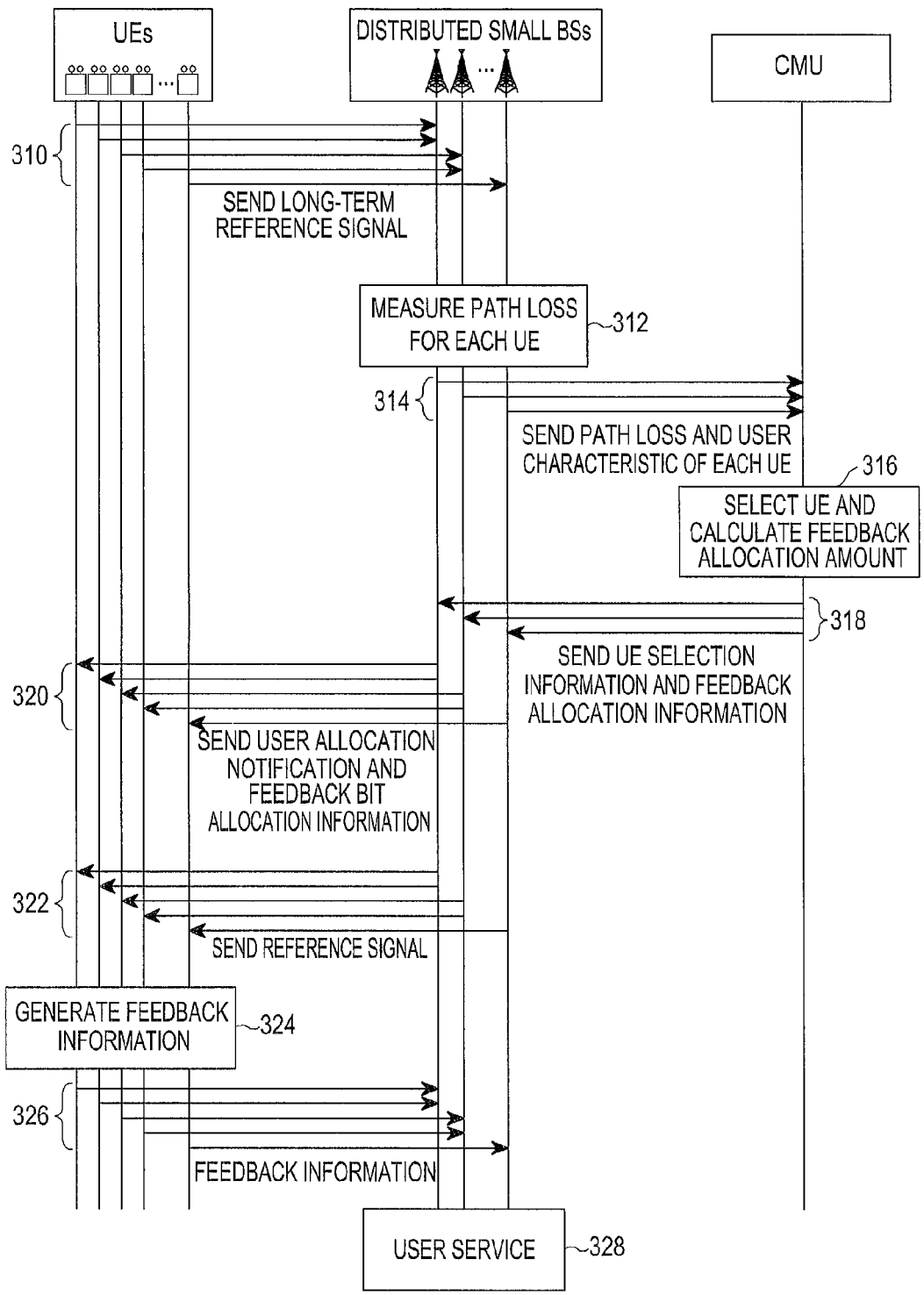
FIG. 3 is a diagram illustrating a signal flow for a signal processing procedure in a VCN system according to an embodiment of the present disclosure.

FIG. 3 is a diagram illustrating a signal flow for a signal processing procedure in a VCN system according to an embodiment of the present disclosure. That is, FIG. 3 defines a procedure for selecting UEs for each distributed small BS, calculating feedback allocation amounts for the selected UEs, and providing a service to the selected UEs accordingly, performed by a CMU in a VCN system.

Referring to FIG. 3, UEs transmit long-term RSs and distributed small BSs receive the RSs from UEs in operation 310. For example, the distributed small BSs may receive only RSs transmitted by UEs connected to them or RSs transmitted by all of the UEs.

The distributed small BSs measure path loss values of the UEs based on the strengths of the received RSs and estimate channel characteristics and the like based on the measured path loss values in operation 312.

The distributed small BSs provide their measured path loss values and characteristics of the UEs to the CMU in order to share the path loss values and characteristics of the respective UEs in operation 314. In this manner, the CMU may collect the path loss values and characteristics of the UEs measured by all of the distributed small BSs.

The CMU selects UEs for each of the distributed small BSs and calculates feedback allocation amounts for the selected UEs, based on the path loss values and characteristics of the UEs collected from the distributed small BSs in operation 316.

For example, the CMU calculates an average Signal to Interference and Noise Ratio (SINR) for each UE based on the path loss values and characteristics of the UEs collected from the distributed small BSs. Then the CMU determines at least one UE to be selected by each distributed small BS, taking into account the average SINRs and characteristics of the UEs, and calculates a feedback allocation amount for the at least one UE. The feedback allocation amount may be the number of feedback bits in which the UE will report quantized channel information.

The CMU provides information about the at least one UE to be selected by each distributed small BS, that is, UE selection information and feedback information to be allocated to the at least one UE, that is, feedback allocation information to the distributed small BS in operation 318.

As described above, each distributed small BS may allocate feedback bits to at least one UE to be selected.

Each distributed small BS indicates to the at least one UE to be serviced according to the UE selection information that the at least one UE is allowed to use a service and provides feedback allocation information to the at least one UE in operation 320.

Each of the distributed small BSs transmits a RS so that the selected at least one UE may generate channel information in operation 322. The at least one UE selected by each distributed small BS may receive the RS from the distributed small BS. When needed for generation of feedback information, the selected at least one UE may receive a RS from a macro BS as well as RSs from other distributed small BSs neighboring the distributed small BS.

The at least one UE generates feedback information based on the RS received from the distributed small BS in operation 324. For example, the at least one UE estimates a downlink channel quality based on the strength of the received RS, configures channel information using the estimated downlink channel quality, and quantizes the channel information. The at least one UE considers the number of feedback bits allocated by the distributed small BS in quantizing the channel information. That is, the at least one UE may generate channel information quantized to the allocated number of feedback bits by the quantization. The at least one UE uses the quantized channel information as feedback information.

The at least one UE transmits the generated feedback information to the distributed small BS that will service the at least one UE, that is, that has selected the at least one UE in operation 326.

Finally, each of the distributed small BSs provides a wireless communication service to the select at least one UE at the same time based on the feedback information received from the selected at least one UE in operation 328.

For example, each of the distributed small BSs may provide the wireless communication service to at least one UE selected by it or additionally to neighbor UEs. However, considering performance degradation of the VCN system caused by interference and the like, each of the distributed small BSs preferably provides the wireless communication service only to UEs selected by it.

Figure 4:
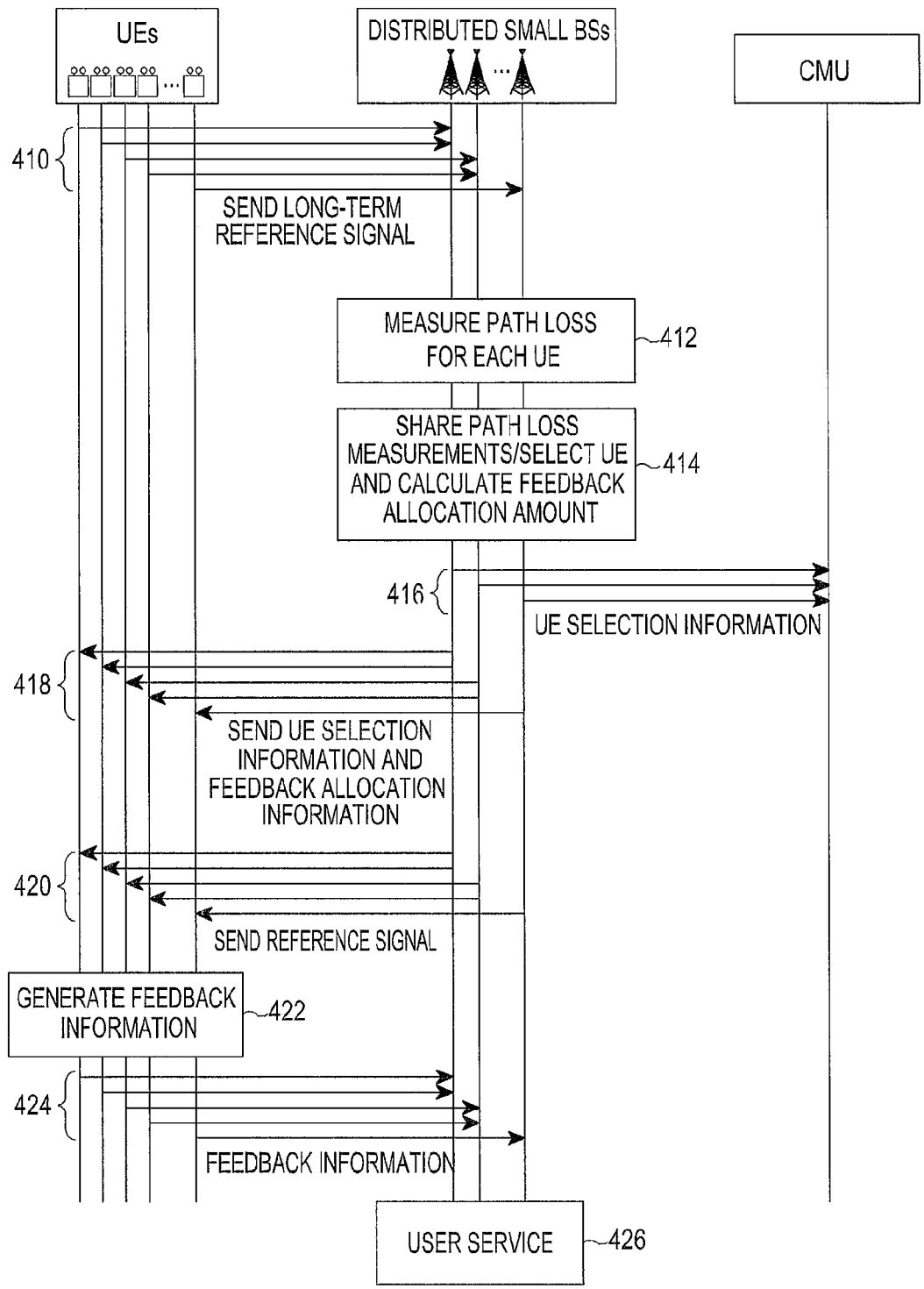
FIG. 4 is a diagram illustrating a signal flow for a signal processing procedure in a VCN system according to another embodiment of the present disclosure.

FIG. 4 is a diagram illustrating a signal flow for a signal processing procedure in a VCN system according to another embodiment of the present disclosure. That is, FIG. 4 defines a procedure for selecting UEs, calculating feedback allocation amounts for the selected UEs, and providing a service to the selected UEs accordingly, performed by each distributed small BS in a VCN system.

Referring to FIG. 4, UEs transmit RSs over a long term and distributed small BSs receive the RSs from UEs in operation 410. For example, the distributed small BSs may receive only RSs transmitted by UEs connected to them or RSs transmitted by all of the UEs.

The distributed small BSs measure path loss values of the UEs based on the strengths of the received RSs and estimate channel characteristics and the like based on the measured path loss values in operation 412.

Each of the distributed small BSs provides its measured path loss values and characteristics of the UEs to other distributed small BSs in operation 414. In this manner, each of the distributed small BSs may collect the path loss values and characteristics of UEs measured by all of the distributed small BSs. Therefore, the distributed small BSs may share the path loss values and characteristics of the UEs measured by each distributed small BS.

After collecting the path loss values measured by the other distributed small BSs, each of the distributed small BSs selects at least one UE to be serviced by it and calculates a feedback allocation amount for the selected at least one UE, based on the path loss values and characteristics of the UEs measured by it in operation 414.

For example, each of the distributed small BSs calculates an average SINR for each UE based on the path loss value and characteristics of each UE collected from the other distributed small BSs. Then the distributed small BS determines at least one UE to be serviced by it, taking into account the average SINRs and characteristics of the UEs, and calculates a feedback allocation amount for the at least one UE, so that the at least one UE may report quantized feedback information in the feedback allocation amount. The feedback allocation amount may be the number of feedback bits in which the UE will report the quantized channel information.

The distributed small BSs provide UE selection information about the selected UEs to be serviced by them to the CMU in operation 416. Thus, the CMU may identify the UEs to which the distributed small BSs will provide a wireless communication service, which facilitates the CMU to manage the distributed small BSs.

Each distributed small BS indicates to the at least one UE to be serviced by it that the at least one UE is allowed to use a service and provides feedback allocation information to the at least one UE in operation 418.

Each of the distributed small BSs transmits an RS so that the selected at least one UE may generate channel information in operation 420. The at least one UE selected by each distributed small BS may receive the RS from the distributed small BS. When needed for generation of feedback information, the selected at least one UE may receive a RS from a macro BS as well as RSs from other distributed small BSs neighboring the distributed small BS.

The at least one UE generates feedback information based on the RS received from the distributed small BS that has selected the at least one UE in operation 422. For example, the at least one UE estimates a downlink channel quality based on the strength of the received RS, configures channel information using the estimated downlink channel quality, and quantizes the channel information. The at least one UE considers the number of feedback bits allocated by the distributed small BS in quantizing the channel information. That is, the at least one UE may generate channel information quantized to the allocated number of feedback bits by the quantization. The at least one UE uses the quantized channel information as feedback information.

The at least one UE transmits the generated feedback information to the distributed small BS that will service the at least one UE, that is, that has selected the at least one UE in operation 424.

Finally, each of the distributed small BSs provides the wireless communication service to the selected at least one UE at the same time based on the feedback information received from the selected at least one UE in operation 426.

For example, each of the distributed small BSs may provide the wireless communication service to at least one UE selected by it or additionally to neighbor UEs. However, considering the degradation of the performance of the VCN system caused by interference and the like, each of the distributed small BSs preferably provides the wireless communication service only to UEs selected by it.

Figure 5:
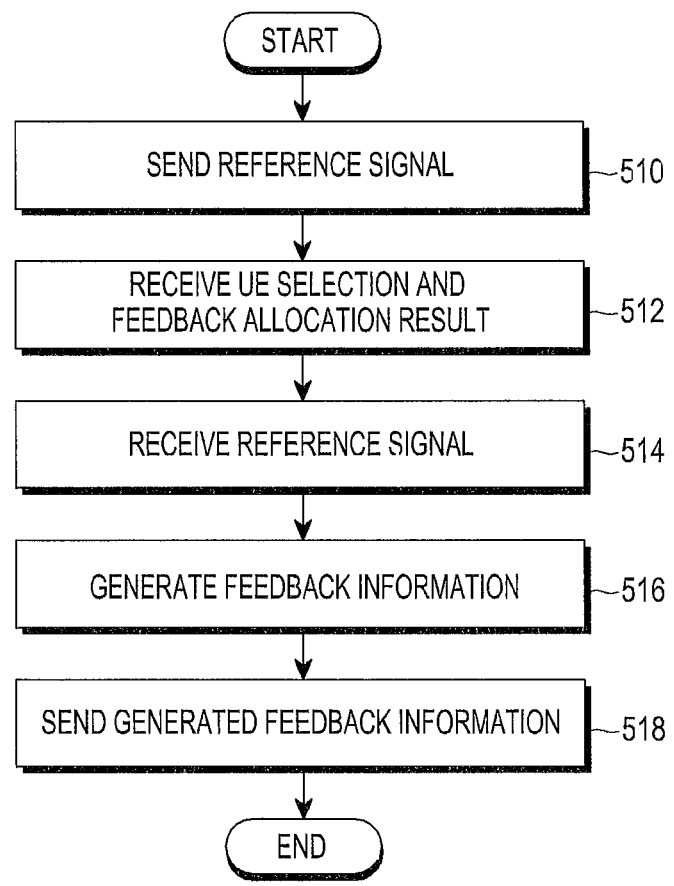
FIG. 5 is a flowchart illustrating a control operation of a User Equipment (UE) for supporting a wireless communication service according to an embodiment of the present disclosure.

FIG. 5 is a flowchart illustrating a control operation of a UE for supporting a wireless communication service according to an embodiment of the present disclosure. The UE has established a link with a distributed small BS in a virtual cell within a macro cell.

Referring to FIG. 5, the UE transmits a long-term RS so that the distributed small BS may measure a path loss of the link established with the UE in operation 510.

The UE receives a UE selection and feedback allocation result from the distributed small BS in operation 512. For example, the UE selection and feedback allocation result may be provided by UE selection information and feedback allocation information. The UE selection information may specify the Identifiers (IDs) of UEs for which the wireless communication service from the distributed small BS is allowed. The feedback allocation information may specify the numbers of feedback bits allocated to the UEs identified by the UE selection information.

The UE receives a RS from the distributed small BS in operation 514. The UE may also receive RSs from other distributed small BSs in addition to the RS from the distributed small BS connected to the UE.

The UE configures channel information for a downlink based on the quality (for example, signal strength) of the RS received from the distributed small BS and generates feedback information by quantizing the channel information according to the allocated number of feedback bits in operation 516.

The UE transmits the generated feedback information to the distributed small BS in operation 518. Thus, the UE may receive a user service from the distributed small BS.

Figure 6:
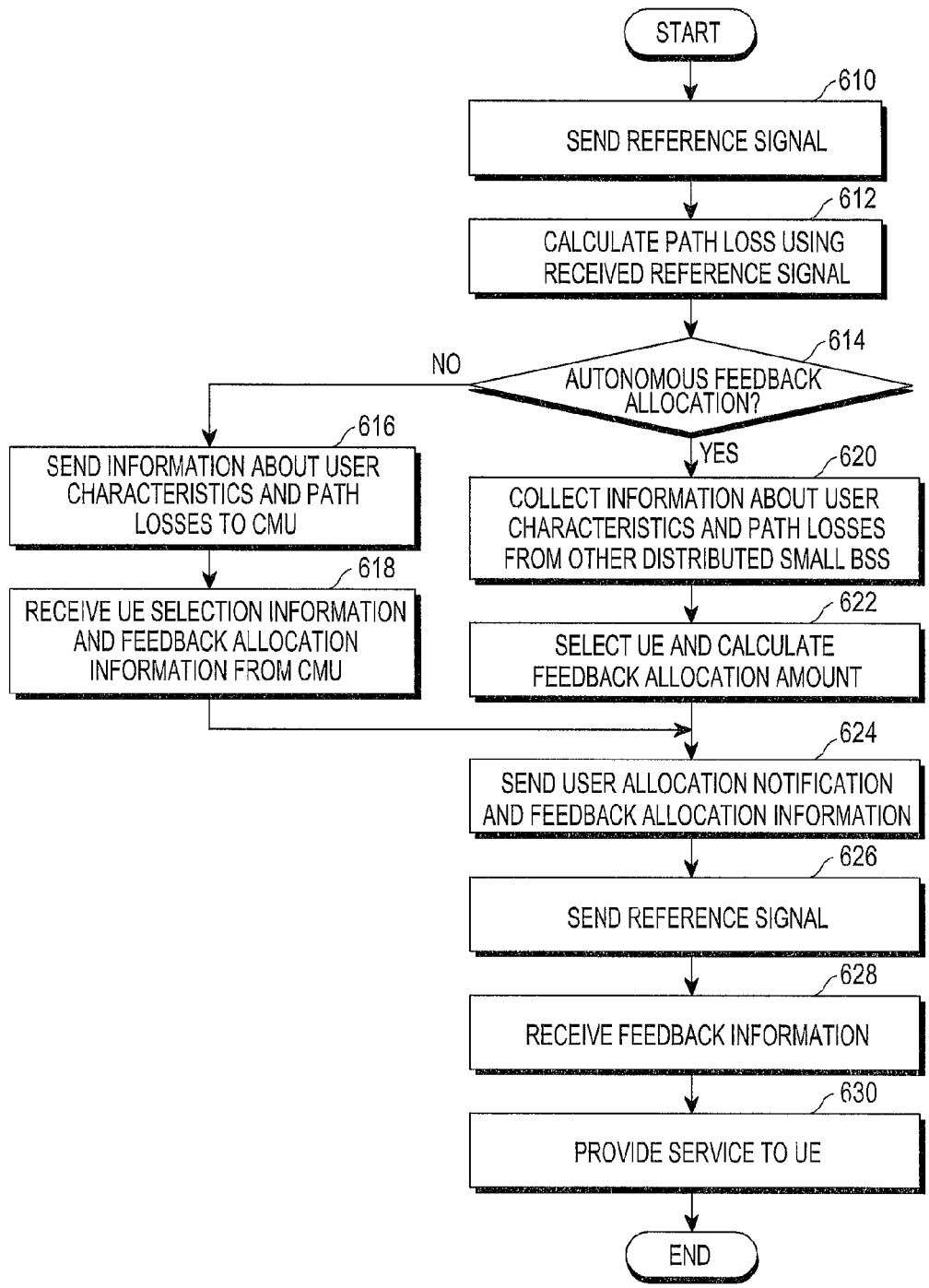
FIG. 6 is a flowchart illustrating a control operation of a distributed small Base Station (BS) for supporting a wireless communication service according to an embodiment of the present disclosure.

FIG. 6 is a flowchart illustrating a control operation of a distributed small BS for supporting a wireless communication service according to an embodiment of the present disclosure. The control operation is based on the premise that the distributed small BS has classified a plurality of UEs located in a virtual cell within a macro cell into a plurality of groups according to their user types.

Referring to FIG. 6, the distributed small BS receives long-term RSs from a plurality of UEs that have established links with the distributed small BS in operation 610. The distributed small BS calculates path losses using the RSs received from the UEs in operation 612. For example, the path loss of a radio link may be defined by a SINR or the like. Since how to calculate a SINR is known, SINR calculation will not be described in detail herein.

The distributed small BS determines whether it is supposed to autonomously select UEs to be serviced by it and calculate feedback allocation amounts for the selected UEs. The autonomous UE selection and calculation of feedback allocation amount means that the distributed small BS is responsible for selecting UEs to be serviced by it and calculating feedback allocation amounts for the selected UEs on its own (the embodiment of FIG. 4). According to another setting, the CMU managing a plurality of distributed small BSs within the macro cell may select UEs to be serviced by each distributed small BS and calculate feedback allocation amounts for the selected UEs (the embodiment of FIG. 3).

If the autonomous feedback allocation is not set, the distributed small BS transmits information about the measured path loss and characteristic of each UE to the CMU in operation 616.

For example, the characteristic of a UE may be the class of the UE. Different maximum data rates (for example, 1 Mbps, 0.5 Mbps, and 0.1 Mbps) may be set for different groups into which UEs are classified according to their classes. UE classes may be defined according to service quality, the characteristic of data to be serviced, the size of a queue for a wireless communication service, and the like.

For example, service quality may be classified into 'first grade', 'second grade', and 'third grade' according to a charging policy applied to users. The characteristic of data to be serviced may be the type of a service to be used by a user. For example, data characteristics may be classified into video service, voice service, and the like.

The distributed small BS receives UE selection information being information about UEs to be serviced by it and feedback allocation information for the UEs from the CMU in operation 618. How the CMU determines UE selection information and feedback allocation information will be described later in detail.

If the autonomous feedback allocation is set, the distributed small BS should already know or directly collect path losses and user characteristics of UEs, calculated on a UE basis by other distributed small BSs. That is, each of distributed small BSs corresponding to virtual cells within a macro cell should be able to share information about its selected UEs and information about feedback allocation amounts for the UEs with the other distributed small BSs.

Therefore, the distributed small BS collects information about a path loss and user characteristic of each UE calculated by the other distributed small BSs in operation 620. The distributed small BSs may collect information about path losses and user characteristics of UEs by direct communication among them or may share the information through the CMU.

If the information about path losses and user characteristics is to be shared through the CMU, a procedure for providing information about path losses and user characteristics to the CMU by each distributed small BS, collecting the information about the path losses and user characteristics by the CMU, and transmitting the collected information to each distributed small BS is preferably further defined.

After the distributed small BS selects UEs to be serviced by it using the path loss and user characteristic of each UE measured by it and the path loss and user characteristic of each UE collected from the other distributed small. BSs, the distributed small BS calculates feedback allocation amounts for the selected UEs in operation 622. A specific method for selecting UEs and determining feedback allocation amounts for the selected UEs will be described later.

The distributed small BS transmits a user allocation notification and feedback allocation information (for example, the numbers of bits in which the selected UE will use feedback information) in operation 624. The user allocation notification and the feedback allocation information may be transmitted to all UEs having links established with the distributed sin all BS or only to the selected UEs to be serviced. Or the user allocation notification may be transmitted to all UEs, whereas the feedback allocation information may be transmitted only to the selected UEs to be serviced. The user allocation notification means a notification indicating to the selected UEs that the wireless communication service is allowed.

The distributed small BS transmits a RS so that the selected UEs or the UEs having links established with the distributed small BS may acquire channel information by measuring downlink qualities in operation 626. The distributed small BS receives feedback information generated based on the transmitted RS by UEs, particularly the selected UEs in operation 628. For example, the feedback information may be generated by quantizing downlink channel information measured from the quality of the RS.

The distributed small BS provides a user service to the selected UEs based on the feedback information received from the selected UEs in operation 630.

While both the embodiments illustrated in FIGS. 3 and 4 are considered in the above-described control operation of FIG. 6, the control operation of FIG. 6 may be performed according to only one of the embodiments. For example, if operations 614, 620, and 622 are omitted and the procedure goes from operation 612 to operation 616 and from operation 618 to operation 624, the control operation corresponds to the embodiment illustrated in FIG. 3. Alternatively, if operations 614, 616, and 618 are omitted and the procedure goes from operation 612 to operation 620 and from operation 622 to operation 624, the control operation corresponds to the embodiment illustrated in FIG. 4.

Figure 7:
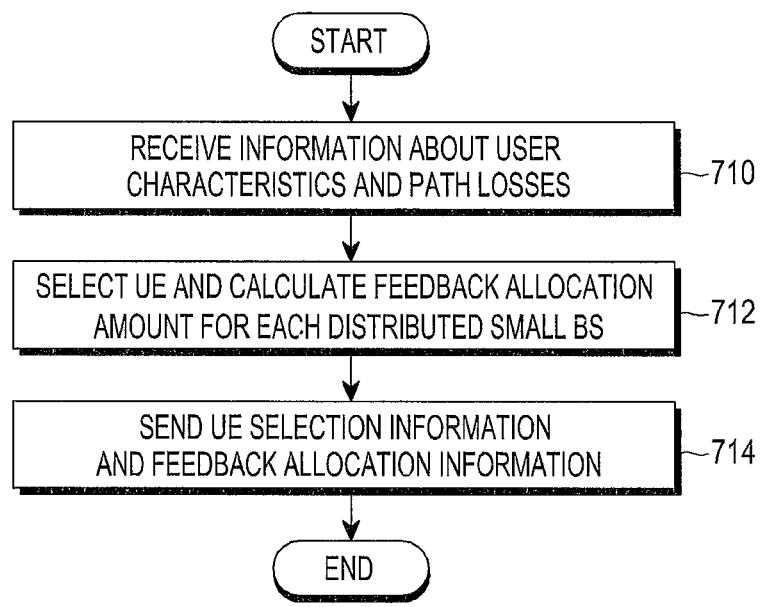
FIG. 7 is a flowchart illustrating a control operation of a Central Management Unit (CMU) for supporting a wireless communication service according to an embodiment of the present disclosure.

FIG. 7 is a flowchart illustrating a control operation of a CMU for supporting a wireless communication service according to an embodiment of the present disclosure. The control operation of FIG. 7 may be confined to the embodiment in which the CMU is responsible for selecting UEs to be serviced by each distributed small BS and calculating feedback allocation amounts for the selected UEs.

Referring to FIG. 7, the CMU receives information about user characteristics and path losses from distributed small BSs in operation 710. The distributed small BSs form virtual cells in a macro cell managed by the CMU. Therefore, the CMU may collect information about the path loss values of UEs calculated by all of the distributed small BSs located in the macro cell and user characteristics of the UEs.

The CMU selects at least one UE to be serviced by each distributed small BS and calculates a feedback allocation amount for the selected at least one UE, based on the path loss and user characteristic of each UE collected from all of the distributed small BSs in operation 712.

For example, the CMU calculates an average SINR for each UE based on the path loss and user characteristic of each UE collected from all of the distributed small BSs. Then the CMU determines at least one UE to be selected by each distributed small BS, taking into account the average SINRs and characteristics of the UEs. The CMU calculates a feedback allocation amount for each of the at least one UE to be selected by each distributed small BS. The feedback allocation amount may be the number of feedback bits in which the UE will report quantized channel information.

The CMU transmits UE selection information being information about the at least one UE to be selected by each distributed small BS and feedback allocation information being feedback information to be allocated to the selected at least one UE in operation 714.

Figure 8:
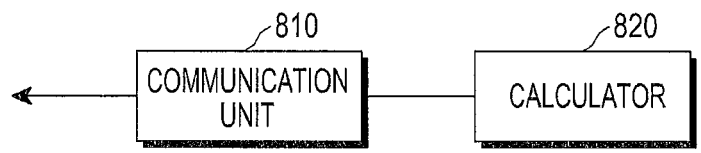
FIG. 8 is a block diagram of an apparatus for providing a wireless communication service, which selects a UE to be serviced by a distributed small BS and calculates a feedback allocation amount for the selected UE, according to an embodiment of the present disclosure.

FIG. 8 is a block diagram of an apparatus for providing a wireless communication service, which selects a UE to be serviced by a distributed small BS and calculates a feedback allocation amount for the selected UE, according to an embodiment of the present disclosure. To implement the embodiment of FIG. 3, the apparatus for providing a wireless communication service is preferably provided in a CMU, whereas to implement the embodiment of FIG. 4, the apparatus for providing a wireless communication service is preferably provided in a distributed small BS.

Irrespective of the embodiments, the apparatus for providing a wireless communication service, illustrated in FIG. 8 performs an operation for providing a wireless communication service to at least one UE from among a plurality of UEs having links established with a distributed small BS that forms a virtual cell in a VCN system in which a plurality of virtual cells are located in one macro cell.

Referring to FIG. 8, a communication unit 810 establishes a wired link or a radio link with an external device using wired resources or radio resources and exchanges information with the external device through the link.

If the communication unit 810 resides in a distributed small BS, the communication unit 810 establishes radio links with UEs using radio resources and exchanges information with the UEs through the radio links. The communication unit 810 also establishes a wired link with the CMU using wired resources and exchanges information with the CMU through the wired link.

For example, the communication unit 810 of the distributed small BS receives RSs and feedback information from UEs or transmits a user allocation notification, a RS, and feedback bit allocation information (information about feedback allocation amounts) to the UEs. The communication unit 810 transmits information about the path loss and user characteristic of each UE to the CMU or receives UE selection information and feedback allocation information from the CMU.

Alternatively, if the communication unit 810 resides in the CMU, the communication unit 810 establishes wired links with distributed small BSs using wired resources and exchanges information with the distributed small BSs through the wired links.

For example, the communication unit 810 of the CMU receives information about the path loss and user characteristic of each UE or UE selection information from the distributed small BSs, or transmits UE selection information and feedback allocation information to the distributed small BSs.

A calculator 820 selects at least one UE to be serviced by each distributed small BS based on the path loss and user characteristic of each UE collected from all distributed small BSs and calculates a feedback allocation amount for each of the selected at least one UE.

For example, the calculator 820 selects one or more UEs from among UEs located within a virtual cell, taking into account the number of feedback bits required to support a maximum data rate required by each UE in the virtual cell within the limit of a total number of feedback bits available in the virtual cell, so that the virtual call may provide a maximum data rate.

The calculator 820 calculates the numbers of feedback bits required to support maximum data rates required by the selected one or more UEs as the feedback allocation amounts.

For example, the calculator 820 may determine the number of feedback bits required to support a maximum data rate required by each UE, based on a service quality to be provided to the UE.

In another example, the calculator 820 may determine the number of feedback bits required to support a maximum data rate required by each UE, based on a characteristic of data to be serviced to the UE.

In another example, the calculator 820 may determine the number of feedback bits required to support a maximum data rate required by each UE, based on the size of a queue provided for a wireless communication service in the UE.

The calculator 820 provides information about UEs selected for the distributed small BSs (UE selection information) and information about a feedback allocation amount calculated for each of the selected UEs (feedback allocation information) to the UEs or the distributed small BSs through the communication unit 810.

The above same purpose may be achieved by performing a different operation in the calculator 820 depending on whether the calculator 820 resides in the CMU or a distributed small BS.

If the calculator 820 is provided in the CMU, the calculator 820 may collect information about the path loss and user characteristic of each UE from all distributed small BSs through the communication unit 810. The calculator 820 selects at least one UE to be serviced by each distributed small BS, taking into account the collected information about the path loss and user characteristic of each UE, and calculates a feedback allocation amount for each of the selected at least one UE. The calculator 820 provides information about the at least one UE selected for each distributed small BS (UE selection information) and information about a feedback allocation amount for each of the selected at least one UE (feedback allocation information) to the distributed small BS through the communication unit 810.

Alternatively, if the calculator 820 is provided in the distributed small BS, the calculator 820 classifies UEs having links established with the distributed small BS into a plurality of groups according to their user types and determines data rates required for the respective groups.

The calculator 820 measures the path loss of each UE in a RS received from the UE. Also, the calculator 820 collects information about the path loss and user characteristic of each UE measured and determined by other distributed small BSs through the communication unit 810.

The calculator 820 selects at least one UE to be serviced by the calculator 820, taking into account the path loss and user characteristic of each UE, calculated by the calculator 820 and the path loss and user characteristic of each UE, collected from the other distributed small BSs, and calculates a feedback allocation amount for each of the selected at least one UE. The calculator 820 provides information about the at least one UE selected for each distributed small BS (UE selection information) and information about a feedback allocation amount for each of the selected at least one UE (feedback allocation information) to UEs through the communication unit 810.

A user characteristic that the calculator 820 considers in selecting a UE or calculating a feedback allocation amount for the selected UE may be a data rate required for each group into which UEs are classified according to user types as defined before.

As mentioned before, there is a need for a method for selecting a UE to be serviced by a distributed small BS and allocating feedback bits to the selected UE in order to implement embodiments of the present disclosure. That is, a method for performing virtual cell formation and feedback allocation simultaneously is needed to maximize a gain that can be achieved by allocating a predetermined number of feedback bits to a UE in a VCN system.

For the convenience of description, the term 'user' is uniformly used. However, it is to be understood that 'user' is interchangeable with 'UE' in the same sense.

Figure 9:
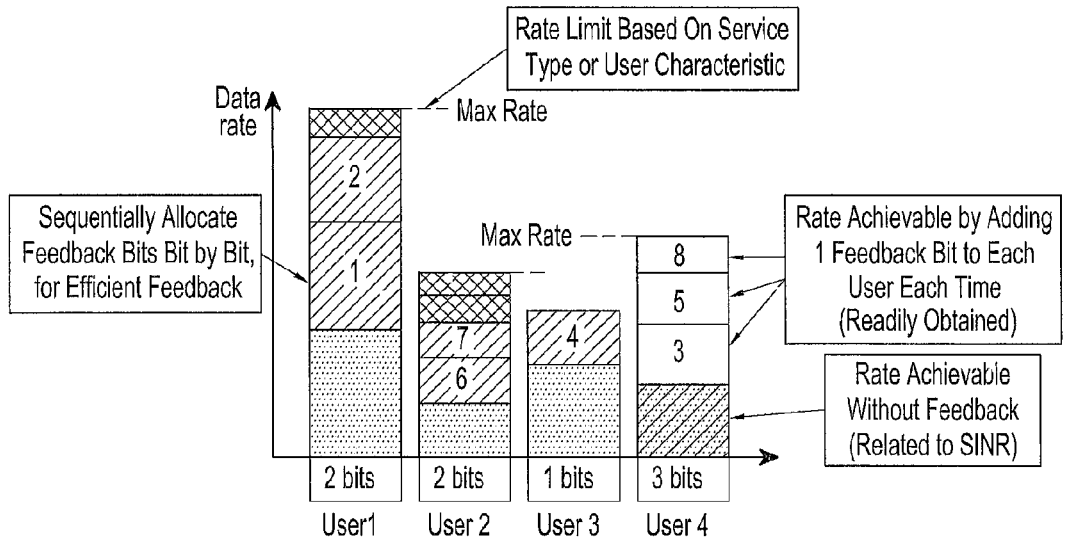
FIG. 9 illustrates user selection and feedback bit allocation that are performed simultaneously in a VCN system according to an embodiment of the present disclosure.

FIG. 9 illustrates user selection and feedback bit allocation that are performed simultaneously in a VCN system according to an embodiment of the present disclosure. In FIG. 9, it is assumed that a total of 8 feedback bits are allocated sequentially in a situation where one distributed small BS has established links with UEs corresponding to four users.

Referring to FIG. 9, four users, User 1, User 2, User 3, and User 4 are classified according to their different characteristics. That is, the four users differ in rate limits (max rates) determined based on their service types or user characteristics. For example, the four users have higher maximum data rates in the order of User 1, User 4, User 2, and User 3.

Different numbers of feedback bits are required to achieve maximum data rates determined for the respective users. In addition, one feedback bit increases the data rate of each user by a different increment. A rate increment that can be achieved basically without feedback is also different for each user.

Accordingly, it is preferred to consider to which user one sequentially selected bit brings the largest rate increase in sequentially allocating feedback bits.

The total 8 feedback bits may be allocated sequentially in the indexed order illustrated in FIG. 9 according to the above feedback allocation rule. Specifically, the first and second feedback bits are allocated to User 1, the third feedback bit to User 4, the fourth feedback bit to User 3, and then the fifth feedback bit to User 4. Subsequently, the sixth and seventh feedback bits are allocated to User 2 and the final eighth feedback bit is allocated to User 4.

As the feedback bits are all allocated in the above manner, two bits, two bits, one bit, and three bits are eventually allocated to User 1, User 2, User 3, and User 4, respectively. In the example of FIG. 9, feedback bits are allocated to all users, which means that all UEs have been selected. However, if allocation of a feedback bit brings a relatively small rate increment to a specific UE, no feedback bit may be allocated to the specific UE. In this case, the specific UE may be regarded as not selected for the service.

In summary, each feedback bit is allocated to a user to which the feedback bit brings the largest rate increment at the time of allocating the feedback bit. Since a predetermined number of feedback bits are allocated to UEs sequentially bit by bit, a gain achievable by the predetermined number of feedback bits can be maximized in the VCN system.

Figure 10:
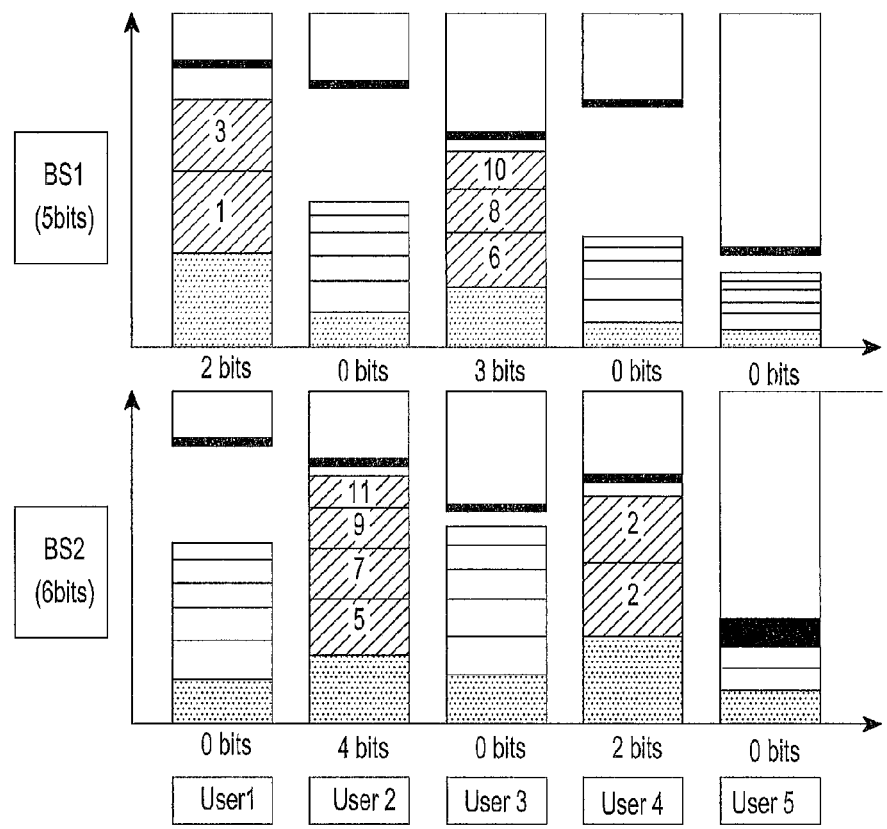
FIG. 10 illustrates user selection and feedback bit allocation that are performed simultaneously in a VCN system according to another embodiment of the present disclosure.

FIG. 10 illustrates user selection and feedback bit allocation that are performed simultaneously in a VCN system according to another embodiment of the present disclosure. In FIG. 10, it is assumed that two distributed small BSs share links with UEs corresponding to five users and a total of 11 feedback bits are allocated sequentially to the UEs.

Referring to FIG. 10, the 11 feedback bits are sequentially selected bit by bit. At the time of selecting each bit, it is determined what distributed small BS and what user in the distributed small BS may achieve the largest rate increment with the feedback bit. Then the feedback bit is allocated to the selected user in the selected distributed small BS. Preferably, feedback bit allocation to each user is confined to one distributed small BS. For example, feedback bits are allocated to User 1 for use only in a first distributed small BS and feedback bits are allocated to User 2 for use only in a second distributed small BS.

For example, the 11th feedback bit brings a higher rate increment to User 3 than to User 2 in the second distributed small BS. However, since feedback bits are already allocated to User 3 for use in the first distributed small BS, the 11th feedback bit is allocated to User 2 in the second distributed small BS.

When the feedback bits are all allocated, User 1 and User 3 are selected in the first distributed small BS and two bits and three bits are allocated respectively to User 1 and User 3. User 2 and User 4 are selected in the second distributed small BS and four bits and two bits are allocated respectively to User 2 and User 4.

In another example, a total number of feedback bits may be predetermined for each distributed small BS. That is, it may be preset that 5 feedback bits are allocated to the first distributed small BS and 6 feedback bits are allocated to the second distributed small BS. In this case, if the predetermined number of feedback bits are allocated to the first or second distributed small BS during sequential allocation of feedback bits in the manner that brings a higher rate increase, no more feedback bits are allocated to the distributed small BS. That is, upon completion of allocating a predetermined number of feedback bits to a specific distributed small BS, the remaining feedback bits are continuously allocated only to the remaining distributed small BS(s).

The method for allocating feedback bits as implemented in the above example may be generalized as follows. It is assumed that after UEs are associated with each distributed small BS according to their SINRs, each distributed small BS allocates feedback bits to at least one UE associated with it.

Given N distributed small BSs and K UEs in total, a data rate that a $k^{th}$ UE may achieve by being allocated $b_k$ feedback bits to receive a service from an $n^{th}$ distributed small BS is determined by equation (1).

$$C_{kn}(b_k) = \mathbb{E}\left[\log_2\left(1 + \frac{\frac{\gamma_{kn} P}{K}|h_{kn}^\dagger v_{kn}|^2}{1 + \sum_{i \neq k} \frac{\gamma_{kn} P}{K}|h_{kn}^\dagger v_{in}|^2 + I_{kn}}\right)\right] \quad (1)$$

In equation (1), $h_{kn}$ represents a channel characteristic between the $k^{th}$ UE and the $n^{th}$ distributed small BS, $\gamma_{kn}$ represents a path loss that the $k^{th}$ UE experiences from the $n^{th}$ distributed small BS, $I_{kn}$ represents an average interference strength that the $k^{th}$ UE experiences, while receiving a service from the $n^{th}$ distributed small BS, and $v_{kn}$ represents a beamforming vector used for the $k^{th}$ UE by the $n^{th}$ distributed small BS.

If the $k^{th}$ UE requires a data rate $C_k^{max}$, a feedback allocation for the $k^{th}$ UE is determined by a problem described in equation (2).

$$\underset{\substack{\{S_1,\ldots,S_N\}\\\{b_1,\ldots,b_K\}}}{\text{maximize}} \sum_{n=1}^{N}\left[\sum_{k \in S_n} \min[C_k^{max}, C_{kn}(b_k)]\right] \quad (2)$$

subject to $$b_k \geq 0 \quad k \in \{1, \ldots, K\},$$

$$\sum_{k \in S_n} b_k \leq B_n \quad n \in \{1, \ldots, N\}.$$

The problem to be solved for the feedback allocation, defined by equation (2) is difficult to solve at the moment. Accordingly, an upper bound of a feedback-caused rate loss that the $k^{th}$ UE experiences during receiving a service from the $n^{th}$ distributed small BS may be calculated by equation (3).

$$\Delta C_{kn} = C_{kn}(\infty) - C_k(b_{kn}) \quad (3)$$

$$= \mathbb{E}\left[\log_2\left(1 + \frac{\frac{\gamma_{kn}P}{K}|h_{kn}^\dagger v_{kn}|^2}{1 + I_{kn}}\right)\right] -$$

$$\mathbb{E}\left[\log_2\left(1 + \frac{\frac{\gamma_{kn}P}{K}|h_{kn}^\dagger v_{kn}|^2}{1 + \sum_{i \neq k}\frac{\gamma_{kn}P}{K}|h_{kn}^\dagger v_{in}|^2 + I_{kn}}\right)\right]$$

$$\leq \mathbb{E}\left[\log_2\left(1 + \frac{\sum_{i \neq k}\frac{\gamma_{kn}P}{K}|h_{kn}^\dagger v_{in}|^2}{1 + I_{kn}}\right)\right]$$

$$\leq \log_2\left(1 + \frac{\gamma_{kn}P}{1 + I_{kn}} \cdot 2^{-\frac{b_k}{K-1}}\right)$$

$$= \log_2\left(1 + K \cdot SINR_{kn} \cdot 2^{-\frac{b_k}{K-1}}\right)$$

An average SINR that may be achieved when the $k^{th}$ UE is serviced by the $n^{th}$ distributed small BS may be calculated by $$SINR_{kn} = \frac{\gamma_{kn}P/K}{1 + I_{kn}}.$$

A lower bound of a data rate that each UE may achieve using the result of equation (3) may be calculated by equation (4).

$$C_{kn}(b_k) \geq C_{kn}(\infty) - \log_2\left(1 + K \cdot SINR_{kn} \cdot 2^{-\frac{b_k}{K-1}}\right) \quad (4)$$

The problem described in equation (2) is converted to equation (5) using equation (3) and equation (4). Then the feedback allocation problem may be solved.

$$\underset{\substack{\{S_1,\ldots,S_N\}\\\{b_1,\ldots,b_K\}}}{\text{maximize}} \quad \sum_{n=1}^{N}\left[\sum_{k \in S_n} \min\left[C_k^{max}, C_{kn}(\infty) - \log_2\left(1 + K \cdot SINR_{kn} \cdot 2^{-\frac{b_k}{K-1}}\right)\right]\right] \quad (5)$$

subject to $$b_k \geq 0 \quad k \in \{1, \ldots, K\},$$

$$\sum_{k \in S_n} b_k \leq B_n \quad n \in \{1, \ldots, N\}.$$

Because $$C_{kn}(\infty) - \log_2\left(1 + K \cdot SINR_{kn} \cdot 2^{-\frac{b_k}{K-1}}\right)$$

is given as a monotonic function being a concave function of the number of feedback bits, a sequential feedback allocation scheme may be proposed based on this property.

For example, feedback bits are allocated by adding one bit to a UE each time in the sequential feedback allocation scheme. As described before, a data rate that may be achieved for each UE by adding one feedback bit to the UE each time according to the path loss of the UE may be approximated to equation (6).

$$C_{kn}(\infty) - \log_2\left(1 + K \cdot SINR_{kn} \cdot 2^{-\frac{b_k}{K-1}}\right) \quad (6)$$

Equation (6) is readily derived as a function of feedback bits.

A rate increment for each UE, resulting from allocating one feedback bit to the UE each time in each distributed small BS may be calculated using equation (6). Therefore, feedback bits are allocated to UEs by comparing performance increments that the allocation of one additional bit brings to the UEs each time. Since each UE is not allowed to get a predetermined or higher data rate, once a predetermined number of feedback bits are allocated to the UE, allocation of any more feedback bits does not increase a rate gain for the UE.

As described before, the proposed virtual cell formation and feedback scheme performs virtual cell formation and feedback allocation simultaneously so as to maximize a gain that can be achieved by allocating a predetermined number of feedback bits to users.

If three UEs experience path losses of (1.85, 1.25, 1.65) and have rate limits of (6, 2, 1) in a distributed small BS, feedback allocation results as illustrated in Table 2 below may be achieved according to the proposed scheme.

TABLE 2

| | 0 ~ 5 dB | 6 ~ 7 dB | 8 dB | 9 ~ 15 dB | 16 dB ~ |
|---|---|---|---|---|---|
| Proposed FB Allocation | (7, 8, 9) | (7, 9, 8) | (8, 9, 7) | (8, 10, 6) | (9, 9, 6) |

Figure 11:
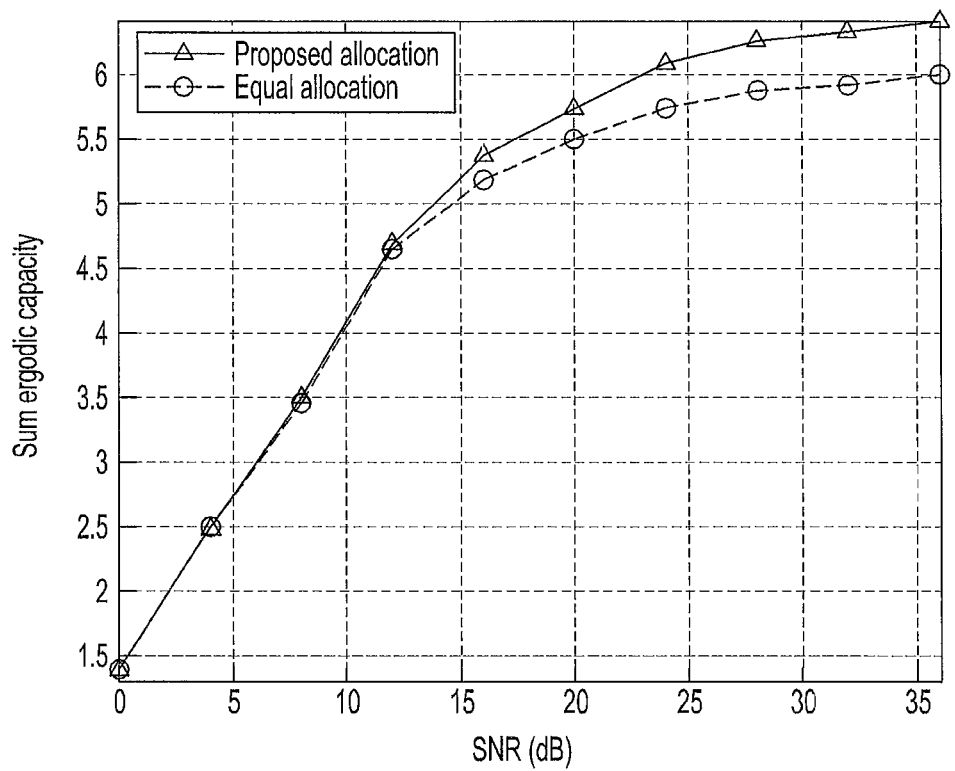
FIG. 11 is a graph illustrating simulated performance of the feedback bit allocation scheme according to the embodiment of the present disclosure.

Performance determined based on the result illustrated in Table 2 is illustrated in FIG. 11. As noted from FIG. 11, the proposed scheme outperforms a conventional equal distribution scheme.

The proposed apparatus and method for forming a virtual cell in a virtual cell network system may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description of the method for forming a virtual cell and transmitting a feedback according to the embodiment of the present disclosure, virtual cell formation and feedback allocation are performed simultaneously. Therefore, a virtual cell can be formed efficiently in consideration of feedback loss.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a wireless communication service to at least one user equipment (UE) from among a plurality of UEs having links established with a distributed small base station (BS) in a virtual cell network (VCN) system in which a plurality of virtual cells exist within one macro cell, the method comprising:
   selecting at least one UE to which a wireless communication service is to be provided in a virtual cell and identifying a feedback allocation amount for each of the selected at least one UE, by sharing path losses and user characteristics measured and determined on a UE basis by each of the plurality of virtual cells; and
   transmitting information about the identified feedback allocation amount to the selected at least one UE.

2. The method of claim 1, wherein the selection and identification comprises:
   collecting path losses and user characteristics measured and determined on a UE basis by each of a plurality of distributed small BSs forming the plurality of virtual cells by a central management unit (CMU) of the VCN system; and
   selecting at least one UE to which the wireless communication service is to be provided in each virtual cell, taking into account the collected path losses and user characteristics and identifying a feedback allocation amount for each of the selected at least one UE.

3. The method of claim 1, wherein the selection and identification comprises:
   collecting path losses and user characteristics measured and determined on a UE basis by other distributed small BSs by a distributed small BS forming the virtual cell; and
   selecting at least one UE to which the distributed small BS forming the virtual cell is to provide the wireless communication service, taking into account the collected path losses and user characteristics and path losses measured and determined on a UE basis by other distributed small BSs by the distributed small BS forming the virtual cell and identifying a feedback allocation amount for each of the selected at least one UE by the distributed small BS fainting the virtual cell.

4. The method of claim 1, wherein the user characteristics comprise data rates required for a plurality of groups into which a plurality of UEs located in the virtual cell are classified according to user types.

5. The method of claim 4, wherein the path losses measured on a UE basis are measured using reference signals (RSs) received from the plurality of UEs.

6. The method of claim 4, further comprising transmitting a reference signal (RS) and receiving channel information generated based on the RS and quantized to a number of feedback bits corresponding to the feedback allocation amount from the at least one UE selected for the virtual cell by the distributed small BS forming the virtual cell.

7. The method of claim 1, wherein the selection and identification comprises:
   selecting at least one UE from among the plurality of UEs located in the virtual cell to provide a maximum data rate in the virtual cell, when a number of feedback bits required to support a maximum data rate required by each UE located in the virtual cell is considered within a total number of feedback bits available to the virtual cell; and
   identifying a number of feedback bits required to support a maximum data rate required by the selected at least one UE as the feedback allocation amount.

8. The method of claim 7, wherein the number of feedback bits required to support the maximum data rate required by each UE is determined based on a service quality to be provided to the UE.

9. The method of claim 7, wherein the number of feedback bits required to support the maximum data rate required by each UE is determined based on a characteristic of data to be serviced to the UE.

10. The method of claim 7, wherein the number of feedback bits required to support the maximum data rate required by each UE is determined based on a size of a queue provided for the wireless communication service in the UE.

11. An apparatus for providing a wireless communication service to at least one user equipment (UE) from among a plurality of UEs having links established with a distributed small base station (BS) in a virtual cell network (VCN) system in which a plurality of virtual cells exist within one macro cell, the apparatus comprising:
   a controller configured to select at least one UE to which a wireless communication service is to be provided in a virtual cell and identify a feedback allocation amount for each of the selected at least one UE, by sharing path losses and user characteristics measured and determined on a UE basis by each of the plurality of virtual cells; and
   a transmitter configured to transmit information about the identified feedback allocation amount to the selected at least one UE.

12. The apparatus of claim 11, wherein in a central management unit (CMU) of the VCN system, the controller is configured to collect path losses and user characteristics measured and determined on a UE basis by each of a plurality of distributed small BSs forming the plurality of virtual cells, select at least one UE to which the wireless communication service is to be provided in each virtual cell, taking into account the collected path losses and user characteristics, and identify a feedback allocation amount for each of the selected at least one UE.

13. The apparatus of claim 11, wherein in a distributed small BS forming the virtual cell, the controller is configured to collect path losses and user characteristics measured and determined on a UE basis by other distributed small BSs, select at least one UE to which the distributed small BS forming the virtual cell is to provide the wireless communication service, taking into account the collected path losses and user characteristics and path losses measured and determined on a UE basis by other distributed small BSs, and identify a feedback allocation amount for each of the selected at least one UE.

14. The apparatus of claim 11, wherein the user characteristics comprise data rates required for a plurality of groups into which a plurality of UEs located in the virtual cell are classified according to user types.

15. The apparatus of claim 14, wherein the controller is configured to measure the path losses on a UE basis using reference signals (RSs) received from the plurality of UEs.

16. The apparatus of claim 14, wherein in the distributed small BS forming the virtual cell, the transmitter is configured to transmit a reference signal (RS) and receive channel information generated based on the RS and quantized to a number of feedback bits corresponding to the feedback allocation amount from the at least one UE selected for the virtual cell.

17. The apparatus of claim 11, wherein the controller is configured to select at least one UE from among the plurality of UEs located in the virtual cell to provide a maximum data rate in the virtual cell, when a number of feedback bits required to support a maximum data rate required by each UE located in the virtual cell is considered within a total number of feedback bits available to the virtual cell, and identify a number of feedback bits required to support a maximum data rate required by the selected at least one UE as the feedback allocation amount.

18. The apparatus of claim 17, wherein the controller is configured to determine the number of feedback bits required to support the maximum data rate required by each UE based on a service quality to be provided to the UE.

19. The apparatus of claim 17, wherein the controller is configured to determine the number of feedback bits required to support the maximum data rate required by each UE based on a characteristic of data to be serviced to the UE.

20. The apparatus of claim 17, wherein the controller is configured to determine the number of feedback bits required to support the maximum data rate required by each UE based on a size of a queue provided for the wireless communication service in the UE.

* * * * *